(12) United States Patent
Ko

(10) Patent No.: US 7,862,059 B2
(45) Date of Patent: Jan. 4, 2011

(54) TORSION BEAM AXLE HAVING CONNECTING TUBE BETWEEN TORSION BEAM AND TRAILING ARM

(75) Inventor: Jung-Min Ko, Siheung-si (KR)

(73) Assignee: Austem Co., Ltd., Cheonan-si (KR)

( * ) Notice: Subject to any disclaimer, the term of this patent is extended or adjusted under 35 U.S.C. 154(b) by 111 days.

(21) Appl. No.: 11/994,819

(22) PCT Filed: Jul. 5, 2006

(86) PCT No.: PCT/KR2006/002620

§ 371 (c)(1),
(2), (4) Date: Jan. 4, 2008

(87) PCT Pub. No.: WO2008/004715

PCT Pub. Date: Jan. 10, 2008

(65) Prior Publication Data

US 2010/0127470 A1 May 27, 2010

(30) Foreign Application Priority Data

Jul. 4, 2006 (KR) .................. 10-2006-0062343

(51) Int. Cl.
*B60G 9/00* (2006.01)
(52) U.S. Cl. .................. 280/124.116; 280/124.128; 280/124.129; 280/124.13
(58) Field of Classification Search .......... 280/124.116, 280/124.128, 124.129, 124.13
See application file for complete search history.

(56) References Cited

U.S. PATENT DOCUMENTS

| | | | | |
|---|---|---|---|---|
| 4,234,205 A | * | 11/1980 | Thiesce | 280/124.107 |
| 4,951,962 A | * | 8/1990 | Tomida et al. | 280/124.108 |
| 5,277,450 A | * | 1/1994 | Henschen | 280/6.151 |
| 5,326,128 A | * | 7/1994 | Cromley, Jr. | 280/656 |
| 5,411,287 A | * | 5/1995 | Henschen | 280/124.169 |
| 6,047,978 A | | 4/2000 | Watanabe et al. | |
| 6,086,162 A | * | 7/2000 | Pinch et al. | 301/124.1 |
| 6,298,962 B1 | | 10/2001 | Kato et al. | |
| 6,921,098 B2 | * | 7/2005 | VanDenberg et al. | 280/124.116 |
| 7,566,063 B2 | * | 7/2009 | Oki et al. | 280/124.106 |
| 7,726,674 B2 | * | 6/2010 | VanDenberg et al. | 280/124.128 |

FOREIGN PATENT DOCUMENTS

| | | |
|---|---|---|
| JP | 05-057417 | 3/1993 |
| JP | 08-216639 | 8/1996 |
| JP | 2005-225252 | 8/2005 |
| JP | 2005-262903 | 9/2005 |

OTHER PUBLICATIONS

PCT/KR2006/002620 International Search Report dated Apr. 4, 2007.

* cited by examiner

*Primary Examiner*—Toan C To
(74) *Attorney, Agent, or Firm*—Schmeiser, Olsen & Watts, LLP

(57) ABSTRACT

A torsion beam axle includes a torsion beam, a plurality of trailing arms made of a material different from that of the torsion beam, and connecting tubes made of a material better than that of the trailing arms with respect to weldability with the torsion beam, and integrally coupled to the trailing arms at one end part thereof, and welded to the torsion beam at the other end part thereof. Thereby, the coupling force between the trailing arms and the torsion beam made of different materials can be improved.

6 Claims, 4 Drawing Sheets

[Fig. 1]
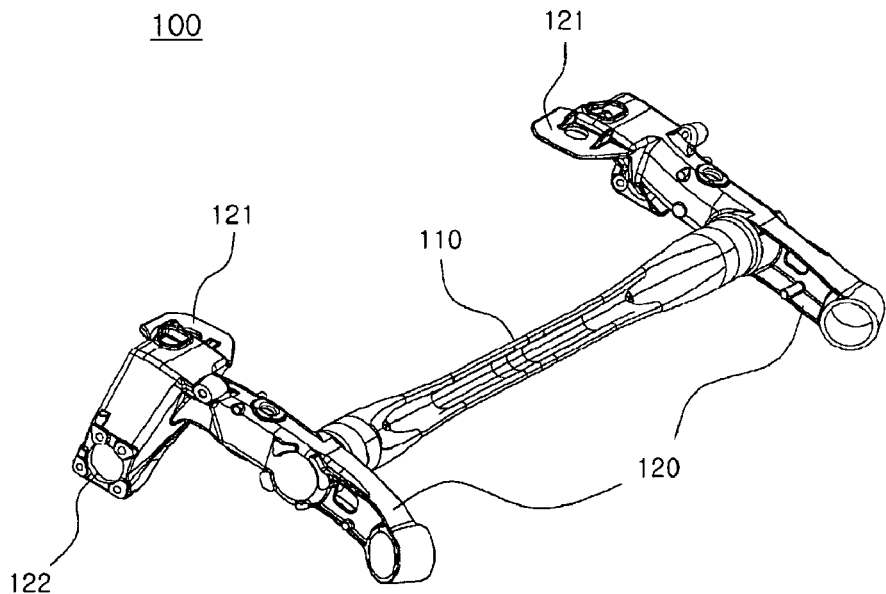
[Fig. 2]
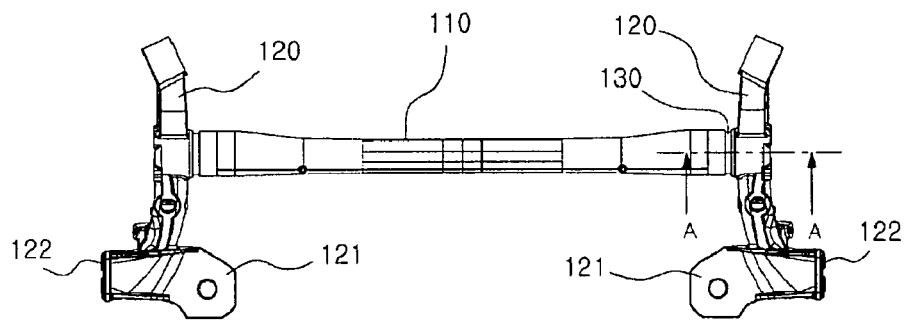
[Fig. 3]
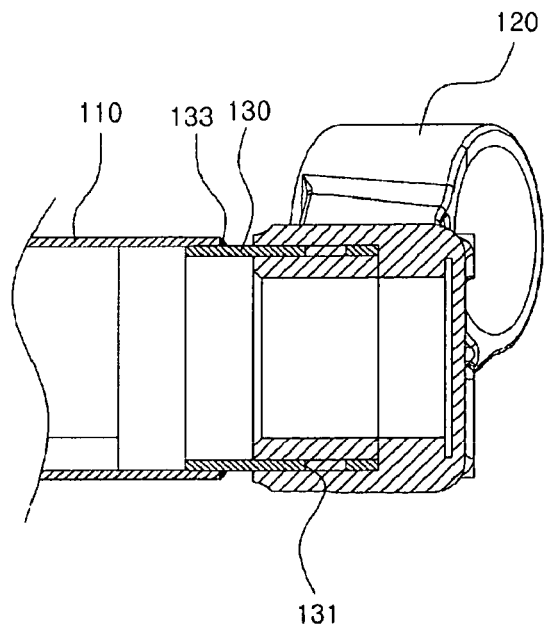

[Fig. 4]
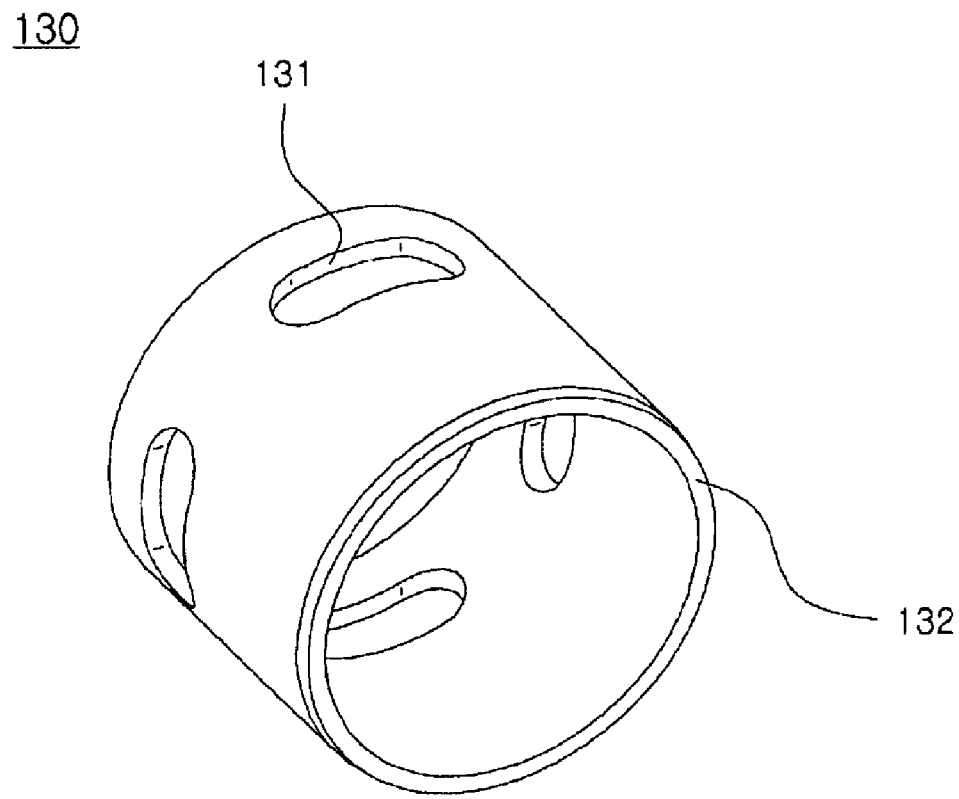
[Fig. 5]
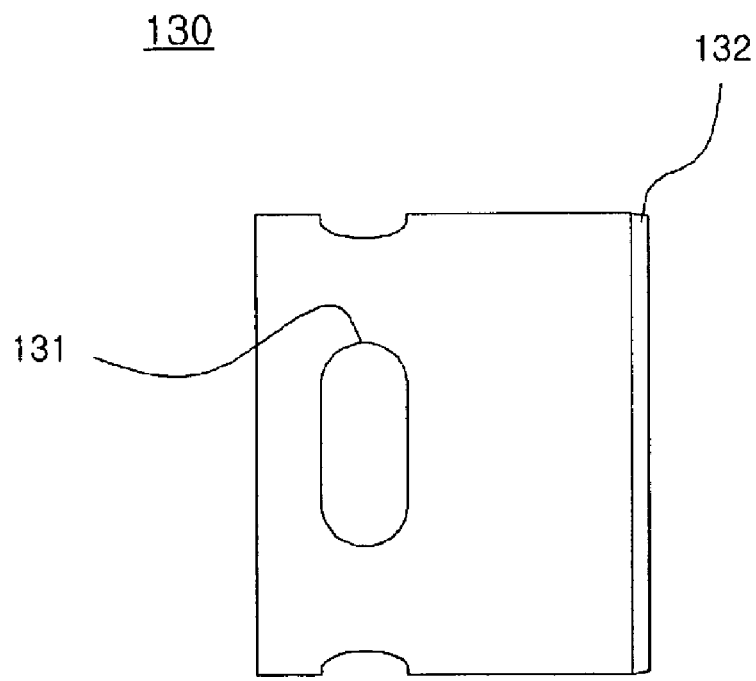

[Fig. 6]
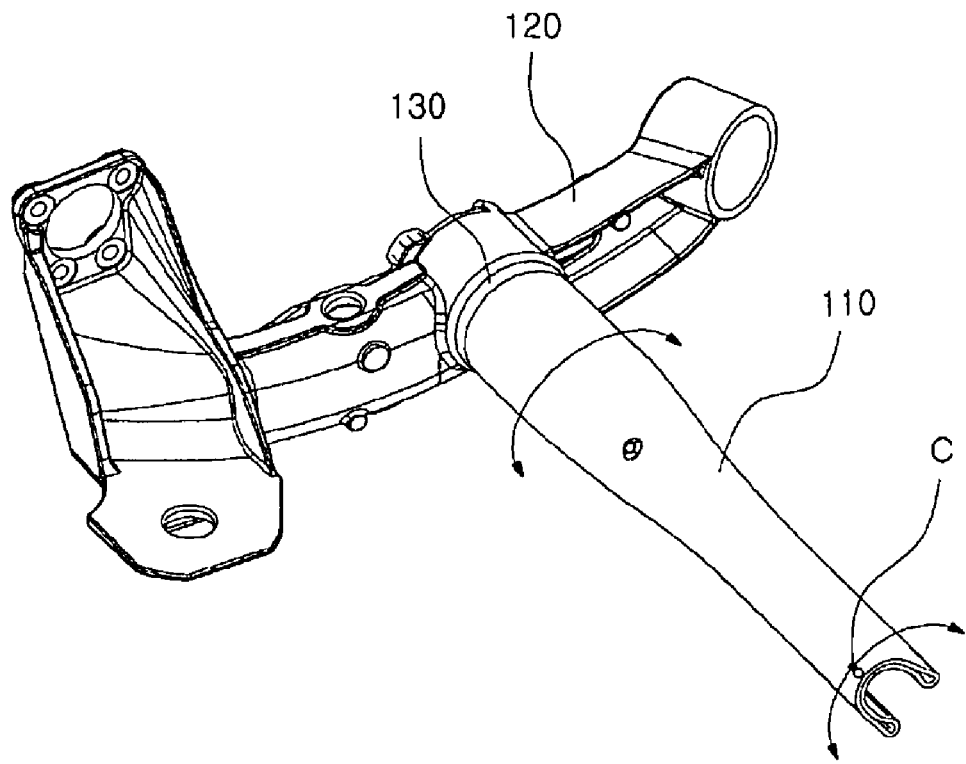
[Fig. 7]
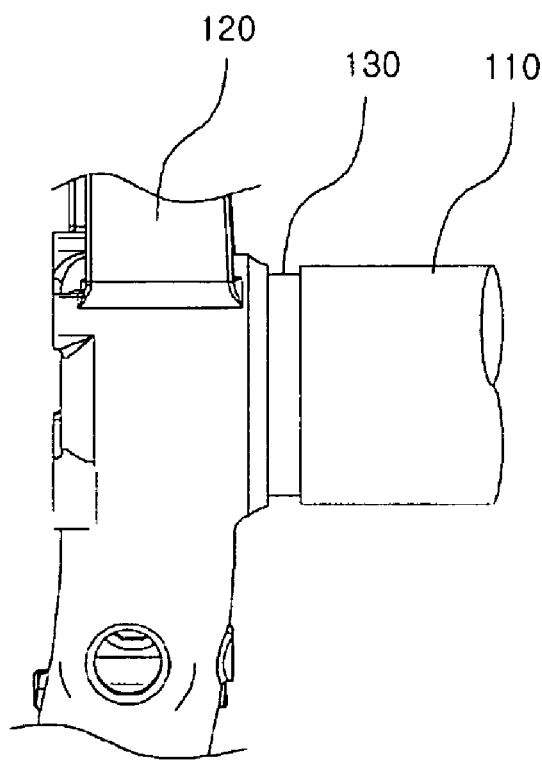

[Fig. 8]
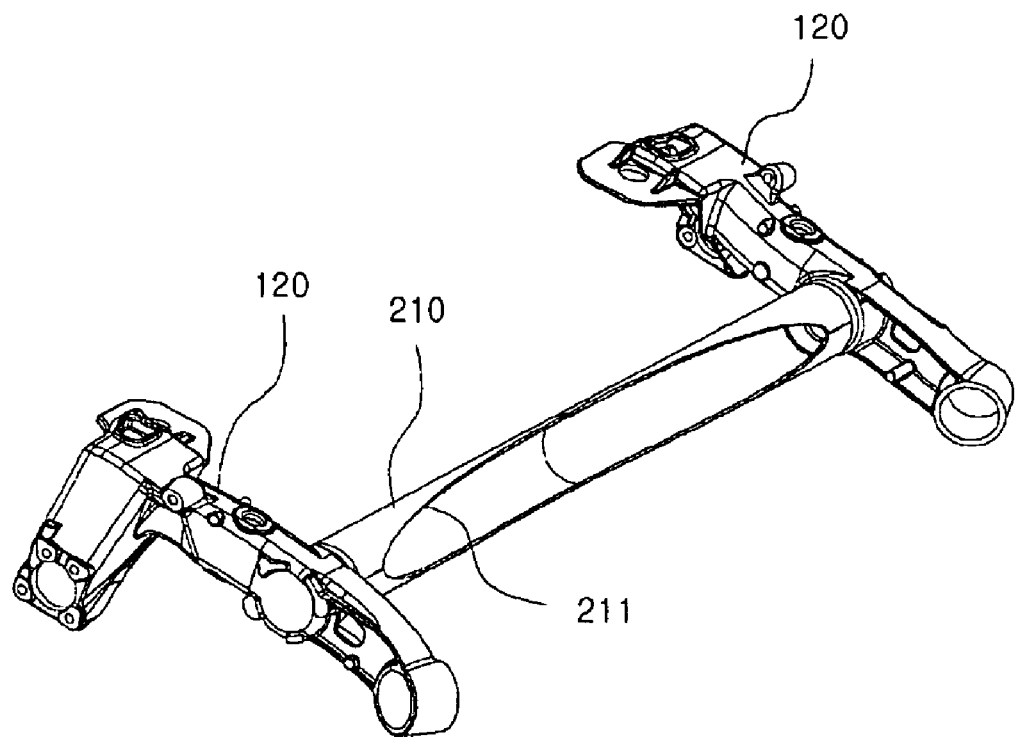
[Fig. 9]
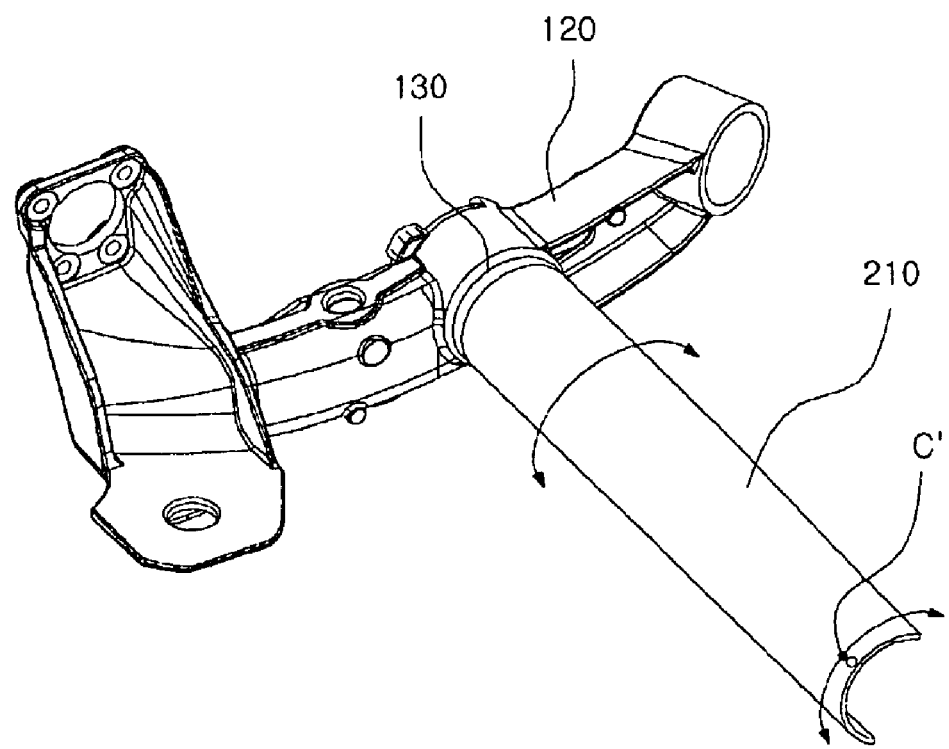

TORSION BEAM AXLE HAVING
CONNECTING TUBE BETWEEN TORSION
BEAM AND TRAILING ARM

TECHNICAL FIELD

The present invention relates, in general, to a torsion beam axle, and more particularly, to a torsion beam axle having connecting tubes for reinforcing coupling force between a torsion beam and trailing arms.

BACKGROUND ART

As is generally known in the art, a torsion beam axle is a kind of suspension system that connects the wheels to the chassis in a vehicle, and includes a plurality of trailing arms that are coupled to the rear (or front) wheels and the chassis, and a torsion beam that connects the trailing arms.

The torsion beam axle has major technical problems in that it must enable good performance of an independent suspension system by implementing a torsion beam having a concurrent torsion characteristic when torsion occurs between the left-hand wheel and the right-hand wheel and simultaneously secure trunk space and price competitiveness, and in that it must make the chassis light by means of an optimized design of the torsion beam.

In the torsion beam axle, the trailing arms are generally made of cast iron in order to improve the supporting force of the left- and right-hand wheels, while the torsion beam is made of steel in order to easily absorb torsion between the left- and right-hand wheels to facilitate elastic torsion deformation during traveling.

At this time, the torsion beam axle must secure sufficient coupling strength between the trailing arms and the torsion beam in the manufacturing process so as to meet load requirements. In this respect, the method of coupling the different materials between the trailing arms and the torsion beam is becoming an important problem.

Conventionally, the coupling method has used fastening elements such as a bolt and nut. However, due to weak coupling strength, the coupling between the trailing arms and the torsion beam has been easy to damage. Friction-welding, in which the trailing arms and the torsion beam are coupled by rotational contact, has been proposed. To this end, expensive equipment has been required, which weakens competitiveness from the aspect of production cost.

DISCLOSURE OF INVENTION

Technical Problem

Accordingly, the present invention has been made in an effort to solve the problems occurring in the related art, and an object of the present invention is to provide a torsion beam axle capable of improving coupling force between each trailing arm and a torsion beam, wherein the trailing arm and the torsion beam make use of different materials.

Technical Solution

In order to achieve the above object, according to one aspect of the present invention, there is provided a torsion beam axle, which includes a torsion beam, a trailing arm having a material different from that of the torsion beam, and a connecting tube having a material better than that of the trailing arm with respect to weldability with the torsion beam, and integrally coupled to the trailing arm at one end part thereof, and welded to the torsion beam at the other end part thereof.

According to another aspect of the present invention, the connecting tube may be inserted into and integrally coupled to the trailing arm at the one end part in the process of casting the trailing arm. In this case, the connecting tube may have a slot for increasing the coupling force with the trailing arm at one end part thereof.

According to another aspect of the present invention, the connecting tube may have an outer diameter large enough to be inserted into the torsion beam at the other end part. In this case, the connecting tube may be press-fitted into the torsion beam at the other end part.

According to another aspect of the present invention, the torsion beam may be made of the same material as the connecting tube. In this case, the trailing arm may be made of cast iron or aluminum alloy, and the torsion beam and the connecting tube may be made of steel.

ADVANTAGEOUS EFFECTS

According to the torsion beam axle of the present invention, the trailing arms and the torsion beam which make use of different materials are coupled via the connecting tubes that are integrally coupled with the trailing arms, so that the coupling force between the trailing arms and the torsion beam can be improved. Particularly, the connecting tubes are welded with the torsion beam by using a material that is better than that of the trailing arms with respect to weldability with the torsion beam, so that the coupling force between the trailing arms and the torsion beam can be improved,

BRIEF DESCRIPTION OF THE DRAWINGS

The above objects, and other features and advantages of the present invention will become more apparent after a reading of the following detailed description when taken in conjunction with the drawings, in which:

FIG. 1 is a perspective view showing a torsion beam axle according to a first embodiment of the present invention;

FIG. 2 is a plan view of the torsion beam axle of FIG. 1;

FIG. 3 is a partially enlarged sectional view taken along the line A-A of FIG. 2;

FIGS. 4 and 5 are perspective and front views showing the connecting tube of FIG. 3;

FIG. 6 is a partial perspective view for explaining a process of coupling the trailing arms and the torsion beam of FIG. 2;

FIG. 7 is a partially enlarged plan view for explaining a process of coupling the trailing arms and the torsion beam of FIG. 2;

FIG. 8 is a perspective view showing a torsion beam axle according to a second embodiment of the present invention; and FIG. 9 is a partial perspective view for explaining a process of coupling the trailing arms and the torsion beam of FIG. 8.

BEST MODE FOR CARRYING OUT THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

As shown in FIGS. 1 and 2, a torsion beam axle 100 according to a first embodiment of the present invention includes a torsion beam 110 and a plurality of trailing arms 120 coupled to opposite ends of the torsion beam 110.

The torsion beam 110 has a continuous tubular shape, in which the cross section of an intermediate portion thereof is curved in a U or V shape, and a cross section of each end thereof is circular. This continuous tubular shape allows the middle of the torsion beam 110 to easily undergo elastic torsion deformation. The torsion beam 110 is typically manufactured by hydro-forming a hollow tube having a circular cross section under a predetermined pressure. The torsion beam 110 makes use of a material such as steel.

Each trailing arm 120 includes chassis couplers 121 coupled with a chassis, and wheel couplers 122 coupled with wheels, and is fixedly coupled to the torsion beam 110 via a connecting tube 130, which will be described below. Preferably, each trailing arm 120 makes use of a high strength material, generally cast iron, so as to be highly resistant to deformation under external force from the chassis or wheels, unlike the torsion beam 110, or high-strength aluminum alloy, in consideration of the weight of the chassis.

In the torsion beam axle 100 having this construction, when different magnitudes of external force are applied from the opposite front (or rear) wheels, the external force can absorbed through torsion deformation of the torsion beam 110, and simultaneously the wheels and chassis can be firmly supported by the trailing arms 120.

Meanwhile, as shown in FIGS. 2 and 3, the torsion beam axle 100 further includes the connecting tubes 130 serving as a medium of connection between the torsion beam 110 and the trailing arms 120. Each connecting tube 130 has one end (the right-hand side in FIG. 3) inserted into and integrally coupled to each trailing arm 120, and the other end (the left-hand side in FIG. 3) inserted into the torsion beam 110 and welded to the torsion beam 110 through an overlapping joint 133.

Here, each connecting tube 130 is inserted into a casting mold of each trailing arm 120 when each trailing arm 120 is cast, partially protrudes from the casting mold on one side thereof, and is integrally coupled with each trailing arm 120 in the process in which molten cast iron is poured into and solidified in the casting mold in the protruding state. At this time, in order to improve coupling force with each trailing arm 120, the other end of each connecting tube 130 can be provided with a plurality of slots 131 (see FIGS. 4 and 5). Of course, the coupling between each connecting tube 130 and each trailing arm 120 is not limited to casting, and may include welding, bolting, and the like.

Preferably, each connecting tube 130 makes use of a material that is better than that of each trailing arm 120 with respect to weldability with the torsion beam 110. In this respect, more preferably, each connecting tube 130 is made of the same material as the torsion beam 110, for instance, steel. Further, because the cast iron has a melting point higher than that of steel, each connecting tube 130 can be integrally coupled with the cast iron without deformation even though it is inserted into the casting mold and is contacted with the molten cast iron in the process of casting each trailing arm 120.

FIGS. 4 and 5 show only each connecting tube 130 which is separated from the other components in FIG. 2 or 3. The shown connecting tube 130 may have a different shape when inserted in the process of casting each trailing arm 120. Even in this case, after the casting is completed, the connecting tube 130 is finished in the shape shown in FIGS. 4 and 5.

Further, as shown in FIG. 3, the connecting tube 130 preferably has an outer diameter that is uniform enough to be inserted into the torsion beam 110, but it is not limited to this construction. For example, the connecting tube 130 may be finished to have an outer diameter such that at least the other end thereof that is coupled to the torsion beam 110 can be inserted into the torsion beam 110.

In addition, the connecting tube 130 preferably has an outer diameter press-fitted into the torsion beam 110 so as to reinforce the coupling force with the torsion beam 110. To this end, the other end 132 of the connecting tube 130 is tapered, as shown in FIGS. 4 and 5, so that the connecting tube 130 can be easily press-fitted into the torsion beam 110. At this time, the connecting tube 130 is subjected to the coupling force by being welded together with the coupling force by frictional force resulting from the press-fitting, thus increasing the overall coupling force with the torsion beam 110.

As described above, when each connecting tube 130 is integrally coupled with each trailing arm 120 in the casting process, and is then welded with the torsion beam 110, the torsion beam 110 can be rotated in the state in which each connecting tube 130 is inserted into the corresponding end of the torsion beam 110, as shown in FIG. 6. Thereby, the shear center C of the torsion beam 110 can be positioned. Thus, when the trailing arms 120 are coupled with the torsion beam 110 via the connecting tubes 130, the shear center C of the torsion beam 110 can be exactly positioned in the process of manufacturing the torsion beam axle 100 as described above. FIG. 7 shows a step of welding a connecting tube 130 with a torsion beam 110, a shear center C of which is adjusted by rotation.

FIG. 8 shows a torsion beam axle 200 according to a second embodiment of the present invention. The torsion beam axle 200 includes a torsion beam 210, and a plurality of trailing arms 120 coupled to opposite ends of the torsion beam 210, and connecting tubes (130 of FIG. 9) serving as a medium of coupling between the torsion beam 210 and each trailing arm 120. Here, portions overlapping the first embodiment will not be described.

The torsion beam 210 is manufactured by rolling a rectangular steel plate to weld opposite ends of the rolled steel plate which are in contact with each other, and cuts out part of an intermediate portion thereof to form an opening 211. The intermediate portion of the torsion beam 210 is readily susceptible to deformation due to the opening 211.

The connecting tubes 130, which are integrally coupled with the trailing arms 120, can be applied in the same way as in the first embodiment, even though the cutout type torsion beam 210 is used. In other words, as shown in FIG. 9, each connecting tube 130 is inserted into the cutout type torsion beam 210, and then positions the shearing center C' thereof while rotating the torsion beam 210. Then, each connecting tube 130 is welded with the torsion beam 210.

As described above, in the torsion beam axle of the present invention, the cross sections of the torsion beam and each connecting tube are not limited to circles, but they may have shapes such as a polygon, an ellipse, etc. if necessary. Even in this case, the connecting tubes of the present invention can still be applied.

In the drawings and specification, typical preferred embodiments of the invention have been disclosed, and although specific terms are employed, they are used in a generic and descriptive sense only, and are not for the purposes of limitation, the scope of the invention being as set forth in the following claims.

The invention claimed is:

1. A torsion beam axle comprising:
   a torsion beam;
   a trailing arm having a material different from that of the torsion beam; and a connecting tube having a material better than that of the trailing arm with respect to weldability with the torsion beam, integrally coupled to the trailing arm at one end part thereof, and welded to the torsion beam at the other end part thereof;

wherein the connecting tube is inserted into and integrally coupled to the trailing arm at the one end part in the process of casting the trailing arm.

2. The torsion beam axle as set forth in claim 1, wherein the connecting tube has a slot for increasing coupling force with the trailing arm at one end part thereof.

3. The torsion beam axle as set forth in claim 1, wherein the connecting tube has an outer diameter large enough to be inserted into the torsion beam at the other end part.

4. The torsion beam axle as set forth in claim 3, wherein the connecting tube is press-fitted into the torsion beam at the other end part.

5. The torsion beam axle as set forth in claim 1, wherein the torsion beam is made of the same material as the connecting tube.

6. The torsion beam axle as set forth in claim 5, wherein:

the trailing arm is made of cast iron or aluminum alloy; and the torsion beam and the connecting tube are made of steel.

\* \* \* \* \*